(12) United States Patent
Langen

(10) Patent No.: US 8,543,996 B2
(45) Date of Patent: Sep. 24, 2013

(54) SYSTEM AND METHOD FOR UPDATING WIND FARM SOFTWARE

(75) Inventor: Reinhard Langen, Haltern (DE)

(73) Assignee: General Electric Company, Schenectady, NY (US)

( * ) Notice: Subject to any disclaimer, the term of this patent is extended or adjusted under 35 U.S.C. 154(b) by 874 days.

(21) Appl. No.: 11/282,126

(22) Filed: Nov. 18, 2005

(65) Prior Publication Data

US 2007/0118626 A1    May 24, 2007

(51) Int. Cl.
*G06F 9/44* (2006.01)
*G06F 9/445* (2006.01)
*G06F 15/177* (2006.01)

(52) U.S. Cl.
USPC ............................ 717/173; 709/221; 717/178

(58) Field of Classification Search
USPC .................................................. 717/168–178
See application file for complete search history.

(56) References Cited

U.S. PATENT DOCUMENTS

| | | | | |
|---|---|---|---|---|
| 5,666,293 A * | 9/1997 | Metz et al. | ..................... | 709/220 |
| 6,035,423 A * | 3/2000 | Hodges et al. | .................. | 714/38 |
| 6,522,955 B1 | 2/2003 | Colborn | | |
| 6,681,156 B1 | 1/2004 | Weiss | | |
| 6,725,377 B1 * | 4/2004 | Kouznetsov | ................... | 717/178 |
| 6,772,192 B1 * | 8/2004 | Fulton et al. | ................... | 717/174 |
| 6,882,904 B1 | 4/2005 | Petrie et al. | | |
| 6,925,385 B2 | 8/2005 | Ghosh et al. | | |
| 6,966,059 B1 * | 11/2005 | Shetty et al. | .................. | 717/172 |
| 7,013,203 B2 | 3/2006 | Moore et al. | | |
| 7,171,287 B2 | 1/2007 | Weiss | | |
| 7,552,432 B2 * | 6/2009 | Aiba | .............................. | 717/177 |
| 7,853,943 B2 * | 12/2010 | McCaleb et al. | ............... | 717/173 |
| 2002/0029097 A1 * | 3/2002 | Pionzio et al. | ................. | 700/286 |
| 2002/0084655 A1 * | 7/2002 | Lof et al. | ......................... | 290/44 |
| 2004/0031030 A1 * | 2/2004 | Kidder et al. | .................. | 717/172 |
| 2004/0103411 A1 * | 5/2004 | Thayer | ........................... | 717/171 |
| 2005/0216911 A1 * | 9/2005 | Yen et al. | ....................... | 717/176 |
| 2006/0100748 A1 | 5/2006 | Schubert | | |

FOREIGN PATENT DOCUMENTS

WO    2005042971 A1    5/2005

OTHER PUBLICATIONS

Jorgen Svensson et al; "Wind Farm Control Software Structure"; Industrial Electrical Engineering and Automation (IEA), Lund University; 15 pgs.
Search Report; Place of Search—Munich; Application No./Patent No. 06124288.9-2211; Dated Jun. 22, 2007; 9 pgs.

* cited by examiner

*Primary Examiner* — Li B Zhen
*Assistant Examiner* — Ryan Coyer
(74) *Attorney, Agent, or Firm* — James McGinness; Armstrong Teasdale LLP

(57) ABSTRACT

A method is provided for updating software of at least one installation in a wind farms wherein the at least one installation is connected to a wind farm network. The method including the steps of establishing a connection between a remote control center and a connection unit of the wind farm, transmitting an update software from the remote control center to the connection unit of the wind farm, transmitting the update software from the connection unit of the wind farm to the at least one installation via the wind farm network, and updating the software of the at least one installation with the update software.

19 Claims, 5 Drawing Sheets

SYSTEM AND METHOD FOR UPDATING WIND FARM SOFTWARE

BACKGROUND OF THE INVENTION

This invention relates generally to a system and method for updating wind farm software, especially for updating wind turbine software of wind turbines in a wind farm.

Wind turbines are complex machines for converting the mechanical energy content of wind into electrical energy. Many of their parts are monitored and controlled by specific software applications. For example, the wind turbine controller is connected to a plurality of sensors for sensing the actual values of e.g. output power, power factor, rotor speed and the like. Based on these values, the control software calculates desired values of controllable variables in accordance with an implemented control strategy. Furthermore, individual sensors or embedded controllers run their own software. In addition to wind turbines, a wind farm also includes other installations such as a wind farm management system, wind met masts, a remote access server, an SQL server and/or substations. Also these installations request information and provide data. Accordingly, communication software is typically installed in all the installations of a wind farm.

From time to time it is necessary to update the software of the installations, either part of it or the entire software package. Typically, updates occur because of software bugs which have to be fixed or due to improvement of the wind turbine software.

For example, a process of updating the turbine software utilizes a remote control center RCC to establish a communication link to a wind turbine to be updated. The RCC then transmits the software update to the turbine, waits for the respective hardware to reboot, and disconnects after successful update is confirmed. These steps have to be performed successively with every single installed wind turbine which is a very time-consuming process. In addition, a large number of wind turbines have been in service for several years. Typically, only analog modem connections to these older wind turbines exist which further limits the rate of data transfer. At typical data volumes, updating may thus take about 1.5 hours for a single turbine. As a result, a software update of all wind turbines of a specific manufacturer may take hundreds to thousands of hours in a given country.

BRIEF DESCRIPTION OF THE INVENTION

In one aspect, a method for updating software of at least one installation in a wind farm is provided, wherein the at least one installation is connected to a wind farm network. The method includes the steps of establishing a connection between a remote control center and a connection unit of the wind farm, transmitting an update software from the remote control center to the connection unit of the wind farm, transmitting the update software from the connection unit of the wind farm to the at least one installation via the wind farm network, and updating the software of the at least one installation with the update software.

In another aspect, a system for updating wind farm software is provided. The system includes at least one installation in a wind farm, wherein the at least one installation is connected to a wind farm network, a connection unit of the wind farm being connected to the wind farm network, and a remote control center which can be connected to the connection unit of the wind farm. The remote control center is adapted for transmitting an update software to the connection unit, and the connection unit is adapted for transmitting the update software to the at least one installation via the wind farm network so that the software of the at least one installation can be updated with the update software.

DETAILED DESCRIPTION OF THE INVENTION

Figure 1:
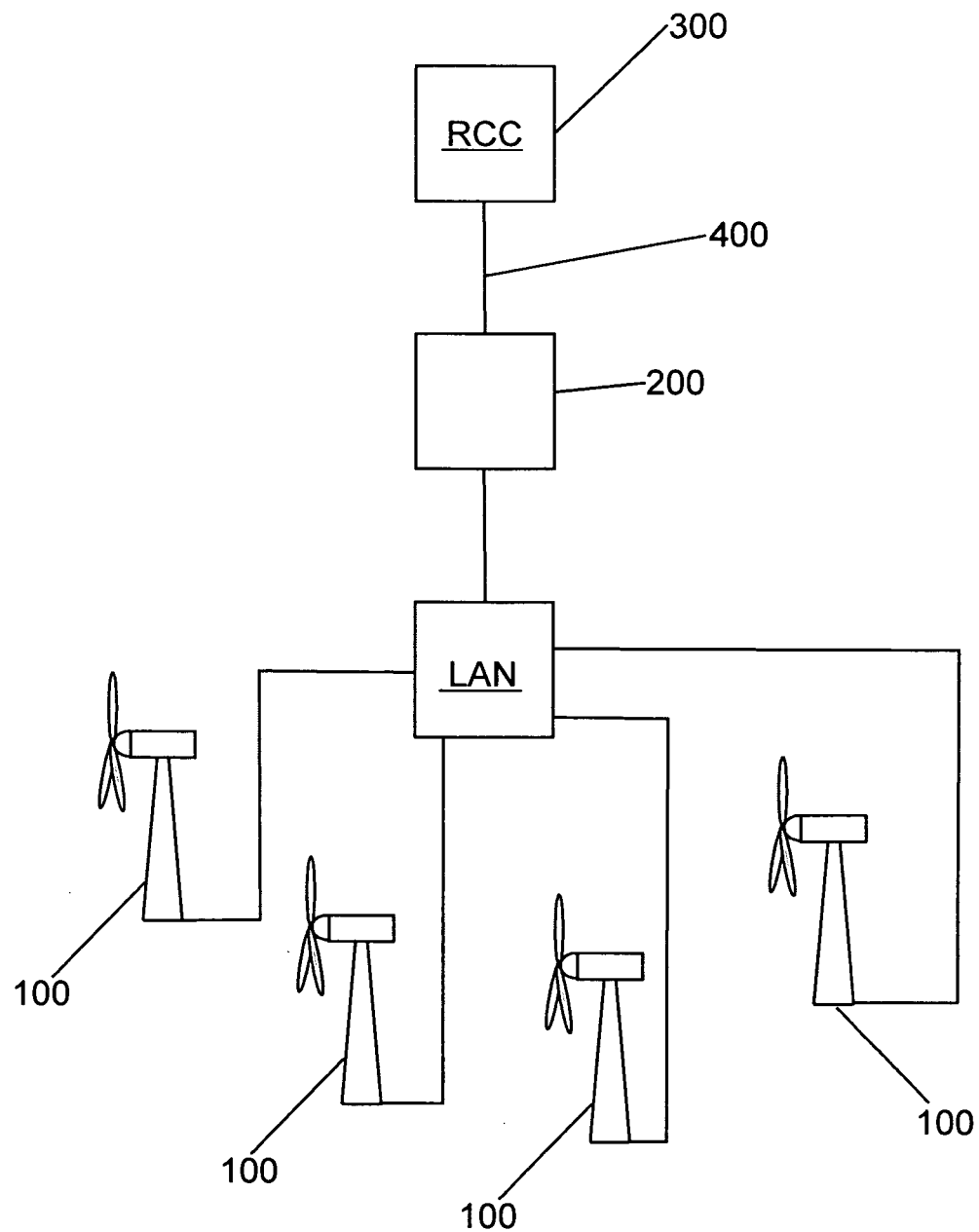
FIG. 1 shows a system according to an embodiment of the present invention.

According to a first aspect of the invention, a method for updating software of installations in a wind farm is provided. Typically, such installations are wind turbines. However, the present invention relates also to other installations in a wind farm like a wind farm management system (WFMS), a wind met mast, a remote access server, an SQL server, and a substation. Software runs on all these installations and they are all connected to the wind farm network. Since wind turbines are the most prominent installations in a wind farm, reference to wind turbines is made in the following. However, it should be understood that the term wind turbine only stands for any of the other installations mentioned above and may be replaced with it.

Wind turbines for wind power generation are typically grouped into so-called wind farms or wind parks having from only a few wind turbines up to large numbers. Especially, large off-shore wind farms are projected that may include up to a hundred wind turbines or more. During recent years regenerative wind energy production increased considerably and it is expected that the number of wind turbines in a wind farm will also increase. Typically, the wind turbines in a wind farm are connected to each other and/or to a wind farm management system via a wind farm LAN. The method according to one embodiment of the present invention takes advantage of the grouping of wind turbines in that it establishes a communication link between a remote control center and a communication port or connection unit of the wind farm. Then, the software update is transmitted from the remote control center to the communication port. After receiving the software update at the wind farm side, the communication port of the wind farm further distributes the software update to the wind turbines via the wind farm network. When a wind turbine receives the software update from the communication port, it updates its software.

Thus, the software update has to be transmitted only once from the remote control center to the wind farm when the method according to the present invention is applied. After that, the wind farm itself updates every wind turbine within the farm. Therefore, the time-consuming transmission of the software update from the remote control center to every single wind turbine is no longer necessary. In particular, the communication link between the remote control center and the communication port can be disconnected after successful transmission and the remote control center may be connected to the communication port of another wind farm. Thus, software updates of wind turbines can be accomplished in a fraction of time compared to the existing update processes. As a result, costs for software updates are considerably lowered.

According to a further aspect of the present invention, a system for updating wind turbine software is adapted to perform an update process according to the first aspect of the present invention. In this aspect, the system includes a wind farm having a wind farm LAN and a communication port or connection unit connected to the wind farm network. Furthermore, a remote control center is provided. The remote control center can be connected to the communication port of the wind farm and is adapted for transmitting update software to the communication port. The communication port, in turn, is adapted for distributing the update software within the wind farm via the wind farm LAN so that the wind turbine software can be updated with the update software.

In particular, FIG. 1 shows a system according to an embodiment of the present invention. A wind farm is formed by wind turbines 100 which are connected to a wind farm LAN. Furthermore, wind turbines 100 are connected to a connection unit 200 via the wind farm LAN. Connection unit 200 in cone embodiment, is connected to a remote control center (RCC) 300 via a communication link 400. The communication link 400 is either a permanent connection, e.g. a copper or fiber optic cable, or a wireless connection which is only established on demand, e.g. by radio transmission or via satellite. Typically, connection unit 200 is a remote access server (RAS). In other embodiments, connection unit 200 is formed by any other suitable means for connecting the wind farm to remote control center 300. Although FIG. 1 shows connection unit 200 separated from wind turbines 100, in other embodiments, connection unit 200 is integrated into one of turbines 100.

Figure 2:
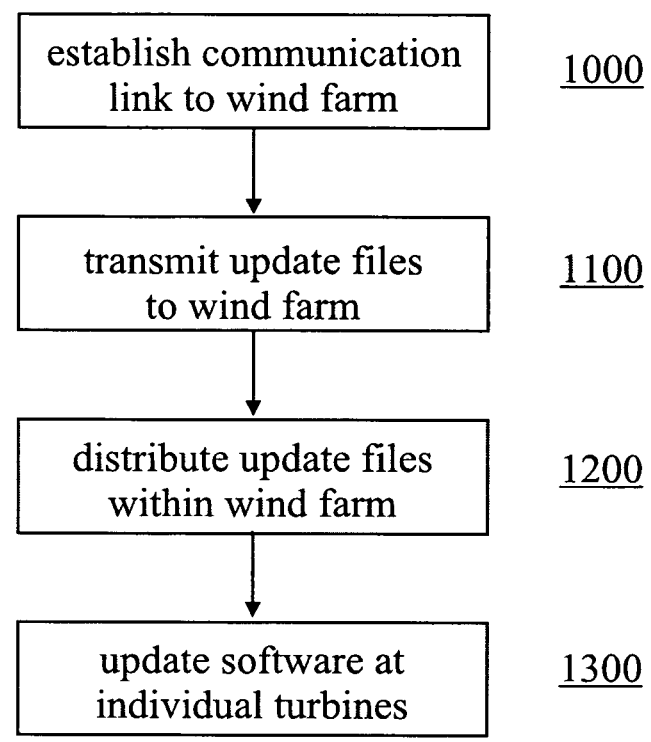
FIG. 2 shows a flow chart of an updating method according to an embodiment of the present invention.

FIG. 2 shows a flow chart depicting an update process according to an embodiment of the present invention. When the software of wind turbines 100 is to be updated, remote control center 300 establishes a communication link 400 to connection unit 200 (step 1000). Then, remote control center 300 transmits the software update, which typically includes a plurality of files, to connection unit 200 via communication link 400 (step 1100). After the software update is successfully uploaded to connection unit 200, connection unit 200 transmits the software update to every wind turbine 100 within the wind farm via the wind farm LAN (step 1200). Distribution of the software update within the wind farm is done either serially or in parallel. After a wind turbine successfully receives the software update, it terminates the software to be updated, installs the update files and restarts the updated program so that the update of the wind turbine software is completed (step 1300).

Figure 3:
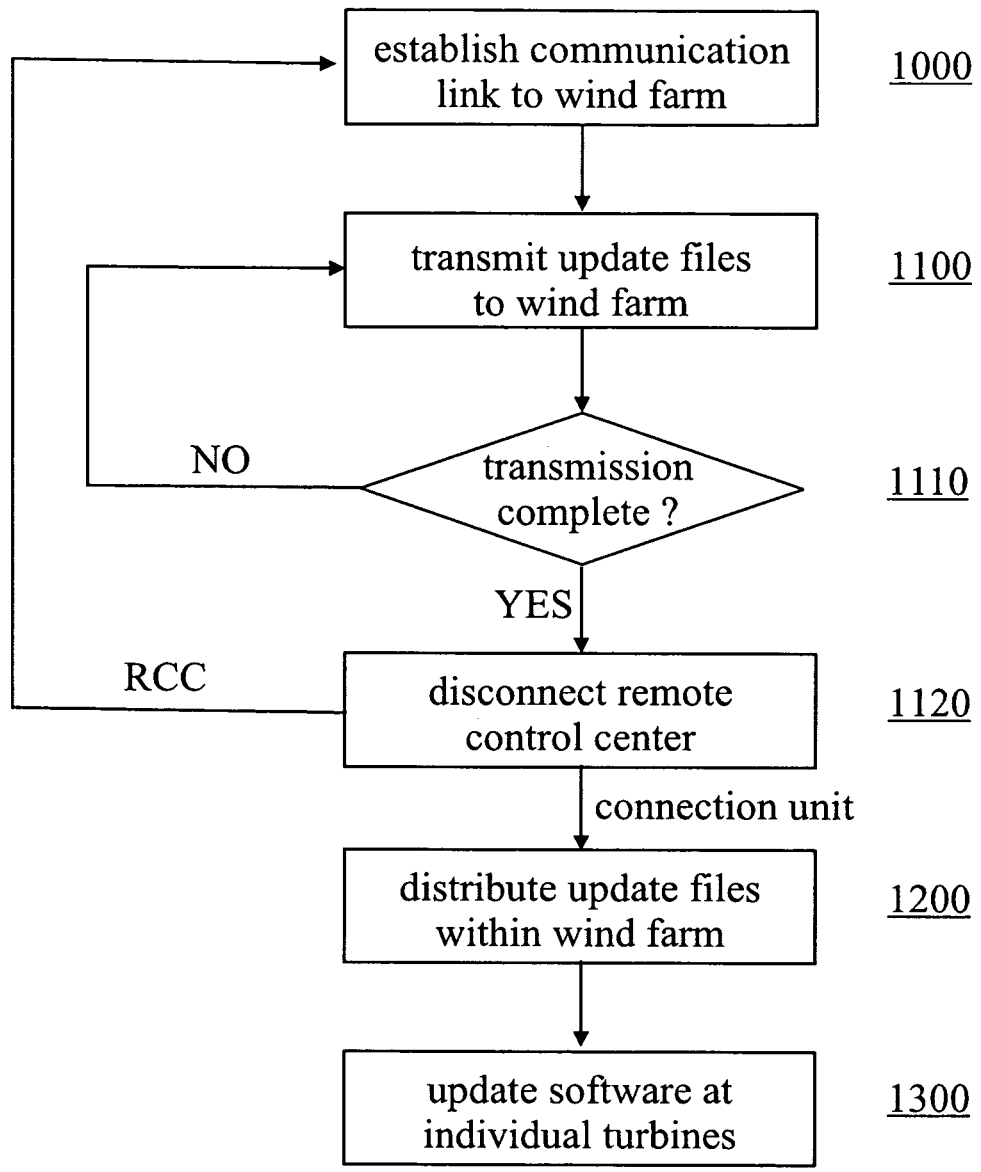
FIG. 3 shows a flow chart of an updating method according to another embodiment of the present invention.

FIG. 3 shows a flow chart of an updating method according to another embodiment of the present invention. The process depicted in FIG. 3 is similar to the process described above. However, it differs in that remote control center 300 disconnects from connection unit 200 after successful transmission of the software update to connection unit 200 (steps 1110 and 1120). Therefore, remote control center 300 can return to step 1000, i.e. establish a communication link to a different connection unit of a different wind farm, while connection unit 200 distributes the uploaded software update within the wind farm. Optionally, the wind turbines report successful updates as well as errors back to connection unit 200 which will report them to remote control center 300 upon the next contact.

Figure 4:
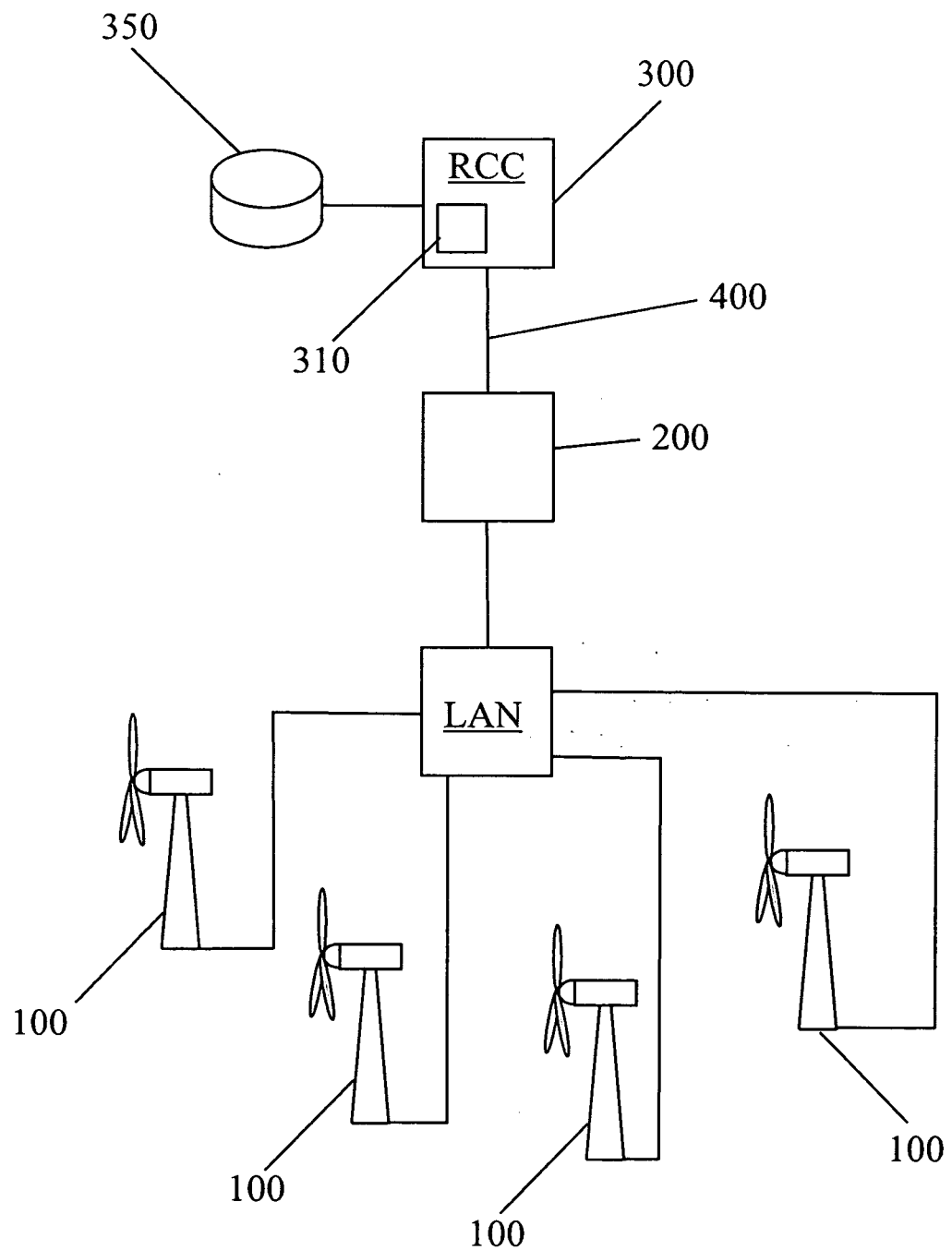
FIG. 4 shows a system according to another embodiment of the present invention.

FIG. 4 shows a system according to another embodiment of the present invention. The configuration of the system shown in FIG. 4 is similar to the system shown in FIG. 1. Therefore, only the differing features will be explained in detail hereinafter. In the system shown in FIG. 4, remote control center 300 includes an upload engine 310. Upload engine 310 is adapted for automatically uploading software updates to wind farms. Furthermore, a database 350 is provided which stores upload information. Upload engine 310 has access to database 350 by either being directly connected to database 350 or through remote control center 300. Typical upload information stored in database 350 is the update files, identification numbers for the wind farms, dial-in numbers for wind farms, wind turbine type or types to which the update relates, the location of wind farms, the software version actually installed on the wind turbines in a wind farm, an update status, i.e. has the farm/turbine been updated yet, a scheduled time for updating and the like. Furthermore, information regarding programmer identity, a time and date of the last update, average connection speed, number of successful uploads, number of failed uploads, upload times, and similar information may be stored in the database.

Figure 5:
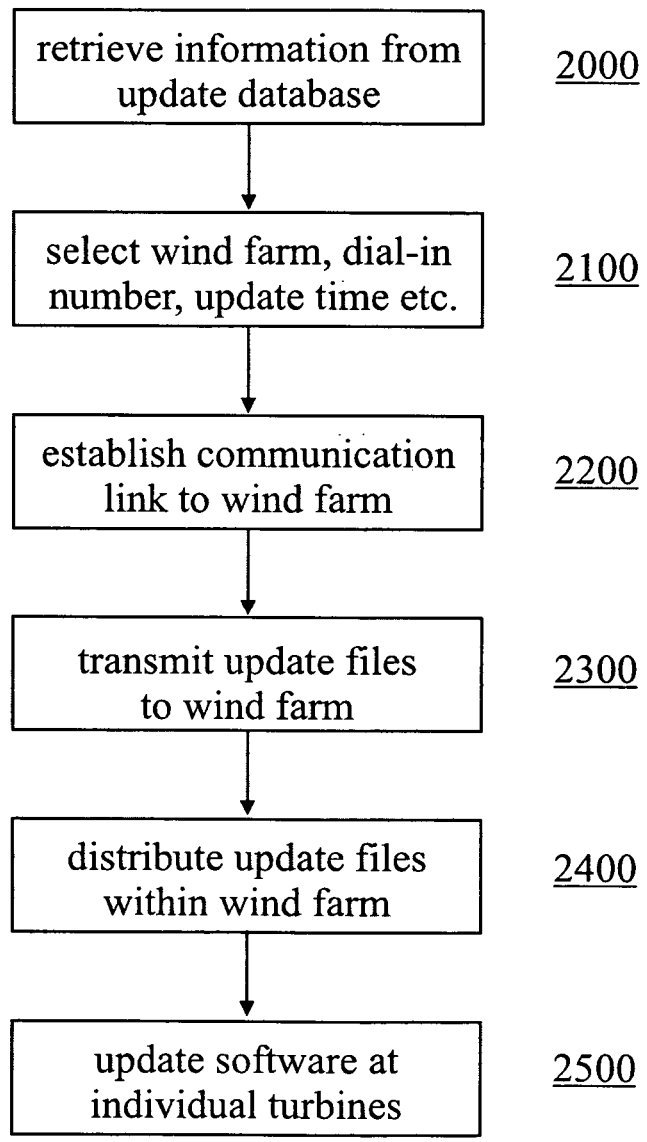
FIG. 5 shows a flow chart of an updating method according to a further embodiment of the present invention.

FIG. 5 is a flow chart of an updating process for the above-described system. Update information is retrieved from database 350 by upload engine 310 (step 2000). Based on this information, upload engine 310 determines the wind farms to which the update files are to be uploaded (step 2100). Furthermore, upload engine 310 also determines a specific time and date for the upload, e.g. during night hours. Also, the dial-in numbers for the wind farms are provided to upload engine 310 so that upload engine 310 automatically establishes a communication link 400 to connection unit 200 of the wind farm (step 2200). Upload engine 310 automatically transmits the update files and, if required, any further information to connection unit 200 (step 2300). After the transmission is complete, transmission, connection unit 200 distributes the software update within the wind farm via the wind farm LAN, either serially or in parallel (step 2400). The software update is installed on the individual turbines and the respective hardware is rebooted if necessary (step 2500).

Thus, the software update is automatically transmitted from remote control center 300 to the wind farm by upload engine 310. An operator only has to create the upload information and store it in the database 350. Then, upload engine 310 and the wind farms updating every wind turbine within the wind farm. Thus, time and costs of updating the plant software are reduced. This advantage becomes especially apparent if the remote control center is disconnected from the connection unit of one wind farm after complete successful transmission of the software update. In this case, the remote control center can connect and transmit to further wind farms while the software update is distributed and installed in the previous one.

According to an even further embodiment, feedback information is provided by the wind farm to remote control center 300. This feedback information is stored in the database 350. Particularly, the feedback information includes information about whether the software update was successful on a specific wind turbine. Thus, a so-called version control can be established in that the software versions actually installed on every individual wind turbine are stored in database 350. This information is easily accessible to an operator even when communication with the turbine is not possible.

Having thus described the invention in detail, it should be apparent for a person skilled in the art that various modifications can be made in the present invention without departing from the spirit and scope of the following claims. For example, it should be understood that the above described systems and methods are suitable for updating not only the wind turbine SCADA software but also other pieces of software like the software for an embedded controller, PLC, current control converter, time synchronization or a sensor. Furthermore, it should be understood that software other than wind turbine software can be updated by the present While the invention has been described in terms of various specific embodiments, those skilled in the art will recognize that the invention can be practiced with modification within the spirit and scope of the claims.

What is claimed is:

1. A method for updating software of a plurality of wind turbines in at least one wind farm of a plurality of wind farms, wherein each wind turbine is connected to a wind farm network, the method comprising:
   retrieving update information that includes identification numbers for the plurality of wind farms, at least one type of wind turbine to which an update software relates, and a software version currently installed on each wind turbine in each of the plurality of wind farms;
   determining a first wind farm of the plurality of wind farms in which to update software of the plurality of wind turbines, based on the update information;
   initiating a communication connection from a remote control center to a first wind turbine of the first wind farm, wherein the first wind turbine includes a connection unit that is connected to the plurality of wind turbines in the first wind farm;
   transmitting the update software from the remote control center to the first wind turbine of the first wind farm;
   terminating the communication connection, upon successful transmission of the update software, between the remote control center and the first wind turbine;
   initiating a communication connection from the remote control center to a connection unit of a second wind farm while the first wind turbine of the first wind farm transmits, using the connection unit, the update software to each of the plurality of wind turbines via the wind farm network; and
   updating the software of the plurality of wind turbines with the update software.

2. The method according to claim 1 wherein the update software comprises a plurality of files.

3. The method according to claim 1 wherein the update software is transmitted to the plurality of wind turbines in parallel.

4. The method according to claim 1 wherein the connection unit of the first wind farm is a remote access server.

5. The method according to claim 1 wherein the connection unit of the first wind farm confirms successful transmission of the update software to the remote control center and the remote control center is disconnected from the connection unit of the first wind farm after receiving the confirmation.

6. The method according to claim 1 wherein the update information is stored in a database and wherein an upload engine automatically transmits the update software based on the update information stored in the database.

7. The method according to claim 6 wherein the update information further includes at least one of the following information: a software update, a programmer identity, a dial-in number, a wind turbine type, a wind turbine location, an installed software version, an update status, a scheduled time for updating, a time and a date of a last update, an average connection speed, a number of successful uploads, a number of failed uploads, and upload times.

8. A system for updating wind farm software within a plurality of wind farms, said system comprising:
   a plurality of installation computers in a first wind farm of the plurality of wind farms, wherein each installation computer of the plurality of installation computers is positioned within a wind turbine connected to a wind farm network;
   a connection unit computer of the first wind farm connected to the plurality of installation computers through the wind farm network; and
   a remote control center computer configured to:
      retrieve update information that includes identification numbers for the plurality of wind farms, at least one type of wind turbine to which an update software relates, and a software version currently installed on each wind turbine in each of the plurality of wind farms;
      determine the first wind farm in which to update wind farm software of the plurality of installation computers based on the update information;
      automatically initiate a communication connection to the connection unit computer of the first wind farm;
      automatically transmit an update software to the connection unit computer;
      terminate the communication connection, upon successful transmission of the update software, to the connection unit computer; and
      initiate a communication connection to a connection unit computer of a second wind farm of the plurality of wind farms,
   wherein the connection unit computer of the first wind farm is configured to transmit the update software to the plurality of installation computers via the wind farm network to update the wind farm software of the plurality of installation computers with the update software while the remote control center computer initiates the communication connection with the connection unit computer of the second wind farm.

9. The system according to claim 8 wherein the connection unit computer of the first wind farm is a remote access server.

10. The system according to claim 8 wherein the update software comprises a plurality of files.

11. The system according to claim 8 wherein the connection unit computer of the first wind farm is configured to transmit the update software to the plurality of wind turbines of the first wind farm in parallel.

12. The system according to claim 8 wherein the connection unit computer of the first wind farm is configured to transmit to the remote control center computer a confirmation of a successful transmission of the update software and the remote control center computer is configured to disconnect from the connection unit computer of the first wind farm after receiving the confirmation.

13. The system according to claim 8 wherein the remote control center computer is connected to a database storing the update information and wherein the remote control center computer comprises an upload engine adapted for automatically transmitting the update software based on the update information stored in the database.

14. The system according to claim 13 wherein the update information stored in the database further includes at least one of the following information: a software update, a programmer identity, a dial-in number, a wind turbine type, a wind turbine location, an installed software version, an update status, a scheduled time for updating, a time and a date of a last update, an average connection speed, a number of successful uploads, a number of failed uploads, and upload times.

15. A system comprising:
   a first plurality of wind turbines arranged in a first wind farm;
   a first connection unit computer coupled to each of the first plurality of wind turbines;

a second plurality of wind turbines arranged in a second wind farm;
a second connection unit computer coupled to each of the second plurality of wind turbines; and
a remote control center computer coupled to the first connection unit computer and to the second connection unit computer, the remote control center computer configured to:
  initiate a first communication connection to the first connection unit computer;
  transmit an update software to the first connection unit computer for distribution to the first plurality of wind turbines;
  terminate the first communication connection, upon successful transmission of the update software, to the first connection unit computer; and
  initiate a second communication connection to the second connection unit computer,
wherein the first connection unit computer is configured to transmit the update software to each of the first plurality of wind turbines to update wind farm software of the first plurality of wind turbines with the update software while the remote control center computer initiates the second communication connection with the second connection unit computer.

16. The system according to claim 15 wherein the update software is transmitted to the first plurality of wind turbines in parallel.

17. The system according to claim 15 wherein the first connection unit computer is a remote access server.

18. The system according to claim 15 wherein the first connection unit computer confirms successful transmission of the update software to the remote control center computer and the remote control center computer is disconnected from the first connection unit computer after receiving the confirmation.

19. The system according to claim 15 wherein the update information is stored in a database and wherein an upload engine automatically transmits the update software based on the update information stored in the database.

* * * * *